(12) United States Patent
Wu et al.

(10) Patent No.: US 11,830,292 B2
(45) Date of Patent: Nov. 28, 2023

(54) SYSTEM AND METHOD OF IMAGE PROCESSING BASED EMOTION RECOGNITION

(71) Applicant: National Yang Ming Chiao Tung University, Taipei (TW)

(72) Inventors: Bing-Fei Wu, Taipei (TW); Wei-Hsiang Su, Taipei (TW); Yi-Chiao Wu, Taipei (TW)

(73) Assignee: NATIONAL YANG MING CHIAO TUNG UNIVERSITY, Taipei (TW)

( * ) Notice: Subject to any disclaimer, the term of this patent is extended or adjusted under 35 U.S.C. 154(b) by 332 days.

(21) Appl. No.: 17/467,398

(22) Filed: Sep. 6, 2021

(65) Prior Publication Data
US 2023/0004738 A1  Jan. 5, 2023

(30) Foreign Application Priority Data
Jun. 30, 2021  (TW) ................................ 110124027

(51) Int. Cl.
| | |
|---|---|
| *G06V 40/16* | (2022.01) |
| *G06T 7/00* | (2017.01) |
| *G06F 18/214* | (2023.01) |
| *G06N 3/045* | (2023.01) |

(52) U.S. Cl.
CPC .......... *G06V 40/176* (2022.01); *G06F 18/214* (2023.01); *G06N 3/045* (2023.01); *G06T 7/0002* (2013.01); *G06V 40/171* (2022.01); *G06T 2207/30168* (2013.01); *G06T 2207/30201* (2013.01)

(58) Field of Classification Search
CPC .... G06F 18/214; G06N 3/0442; G06N 3/045; G06N 3/0464; G06N 3/09; G06T 2207/30168; G06T 2207/30201; G06T 7/0002; G06V 10/806; G06V 10/82; G06V 10/993; G06V 40/171; G06V 40/176

See application file for complete search history.

(56) References Cited

U.S. PATENT DOCUMENTS

2021/0065712 A1* 3/2021 Holm ...................... G10L 15/02

* cited by examiner

*Primary Examiner* — Manuchehr Rahmjoo

(57) ABSTRACT

A system of image processing based emotion recognition is disclosed. The system principally comprises a camera and a main processor. Particularly, there a plurality of function units provided in the main processor, including: face detection unit, feature processing module, feature combination unit, conversion module, facial action judging unit, and emotion recognition unit. According to the present invention, the emotion recognition unit is configured to utilize a facial emotion recognition (FER) model to evaluate or distinguish an emotion state of a user based on at least one facial action, at least one emotional dimension, and a plurality of emotional scores. As a result, the accuracy of the emotion recognition conducted by the emotion recognition unit is significantly enhanced because basis of the emotion recognition comprises basic emotions, emotional dimension(s) and the user's facial action.

20 Claims, 6 Drawing Sheets

SYSTEM AND METHOD OF IMAGE PROCESSING BASED EMOTION RECOGNITION

BACKGROUND OF THE INVENTION

1. Field of the Invention

The present invention relates to the technology field of emotion recognition, and more particularly to a system and method of image processing based emotion recognition.

2. Description of the Prior Art

Nowadays, highly-convenient transportations and high-tech electronic products speed life pace. However, research reports have indicated that, living in fast-paced life in the long run leads people to feel stress on their life, thereby producing a series of negative consequences. Findings from previous studies have shown that psychological stress responses often include negative emotions. In other words, people experience a complex array of negative emotions, such as depression, anxiety, anger, and distress during real-life stressful events. Therefore, for the purpose of preventing the undesirable events from occurring, there is a need for everyone to be treated with emotion recognition in some circumstances and/or environments.

U.S. Pat. No. 9,972,341 B2 has disclosed an apparatus for emotion recognition. The apparatus includes a frame parameter generator configured to detect a plurality of unit frames from an input speech and to generate a parameter vector for each of the unit frames, a key-frame selector configured to select a unit frame as a key frame among the plurality of unit frames, an emotion-probability calculator configured to calculate an emotion probability of each of the selected key frames, and an emotion determiner configured to determine an emotion of a speaker based on the calculated emotion probabilities. On the other hand, China Patent Publication No. CN104391569A has disclosed an apparatus using brain-computer interface (BCI) to carry out emotion recognition. In summary, for achieving an individual's emotion recognition, conventional technologies commonly utilize at least one signal sensing device to collect at least one physiological signal like voice signal and/or brainwave signal from the individual, thereby distinguishing an immediate emotion type of the individual after a series of processes of the physiological signal are completed.

Furthermore, with the well development and wide applications of technologies of machine vision (MV) and machine learning (ML), it is allowable to achieve facial emotion recognition of an individual by using a camera and a microprocessor. For example, U.S. Pat. No. 9,576,190 B2 has disclosed a system for recognizing a customer's facial emotion in a videoconference. According to the disclosures of U.S. Pat. No. 9,576,190 B2, the system comprises at least one camera and a microprocessor, of which the camera is used to acquire an image from a participant (i.e., customer). Particularly, there is a Viola-Jones algorithm provided in the microprocessor, such that the microprocessor is able to detect the face region in the image received from camera. Moreover, the microprocessor is also provided with an active shape models (ASM) algorithm therein, and the ASM algorithm is applied to the face region to locate reference feature points associated with the face of the customer. As described in more detail below, because these feature reference points include one or more facial landmarks, it is allowable for the microprocessor to determine that the at least one facial landmark refers to a plurality of facial feature templates, thereby generating a communication bearing data associated with the facial emotion. Engineers skilled in development and manufacture of apparatus for facial emotion recognition certainly know that, there are many famous databases for acquiring facial feature samples, for example, Fer2013 dataset, Real-world Affective Faces (RAF) Database, AffectNet Dataset, CK+, and JAFFE.

It is known that, discrete emotion theory is the claim that there is a small number of core emotions. For example, Silvan Tomkins concluded that there are nine basic emotions: interest, enjoyment, surprise, distress, fear, anger, shame, dissmell (reaction to bad smell) and disgust. Discrete emotion theory states that these specific core emotions are biologically determined emotional responses whose expression and recognition is fundamentally the same for all individuals regardless of ethnic or cultural differences. On the other hand, Mehrabian and Russell (1974) introduced pleasure, arousal and dominance as three independent emotional dimensions to describe people's state of feeling.

In brief, when conducting facial emotion recognition, the above-mentioned conventional system of image processing based emotion recognition often firstly complete the training and learning performed by a learning platform so as to generate a specific facial emotion recognition (FER) model. Subsequently, the FER model is provided in the microprocessor, such that microprocessor is allowed to achieve an individual's facial emotion recognition under the execution of the FER model. In other words, the conventional system of image processing based emotion recognition not refers to or uses the three emotional dimensions during the conduction of facial emotion recognition, and this means that the accuracy of a result of the facial emotion recognition made by the conventional system is remained to be discussed.

According to above descriptions, it is understood that there is still room for improvement in the conventional system of image processing based emotion recognition. In view of that, inventors of the present invention have made great efforts to make inventive research and eventually provided a system of image processing based emotion recognition.

SUMMARY OF THE INVENTION

The primary objective of the present invention is to disclose an image processing based emotion recognition system, comprising: a camera and a main processor. Particularly, there a plurality of function units provided in the main processor, including: face detection unit, feature processing module, feature combination unit, conversion module, facial action judging unit, and emotion recognition unit. According to the present invention, the emotion recognition unit is configured for using an emotion state recognizing model so as to evaluate an emotion state of a user based on at least one facial action, at least one emotional dimension, and a plurality of emotional scores.

Briefly speaking, after the face detection unit detect a face region from a user image that is acquired from a user by the camera, the feature processing module is enabled to extract a plurality of facial features, at least one feature of emotional dimensions and at least one feature of facial action from the face region. As a result, the accuracy of an emotion recognition conducted by the emotion recognition unit is significantly enhanced because basis of the emotion recognition comprises basic emotions, emotional dimension(s) and the user's facial action.

For achieving the primary objective, the present invention discloses an embodiment for the system of image processing based emotion recognition, comprising:

a camera, being faced to a user for capturing a user image;
a main processor, being coupled to the camera, and comprising one or more embedded programs including instructions for:
detecting a face region from the user image;
extracting a plurality of facial features and a plurality of facial expression features from the face region, and subsequently outputting the plurality of facial features by a form of a first feature vector, and outputting the plurality of facial expression features by a form of a second feature vector;
combining the first feature vector and the second feature vector to a third feature vector, and then utilizing a recurrent neural network (RNN) model to conduct a dimensionality reduction of the third feature vector, thereby producing an input feature vector;
converting the input feature vector to a plurality of emotional scores that are respectively corresponding to a plurality of basic emotions, and also converting the input feature vector to an emotion dimension value;
converting the input feature vector to a plurality of facial action values, and then determining a facial action based on the plurality of facial action values; and
utilizing a facial emotion recognition (FER) model to evaluate an emotion state of the user according to the facial action, the emotion dimension value, the plurality of emotional scores.

Moreover, the present invention also discloses an embodiment for the method of image processing based emotion recognition, comprising a plurality of steps of:

(1) capturing a user image form a user by using a camera;
(2) detecting a face region from the user image by using a main processor;
(3) using the main processor to extract a plurality of facial features and a plurality of facial expression features from the face region, to output the plurality of facial features by a form of a first feature vector, and to output the plurality of facial expression features by a form of a second feature vector;
(4) using the main processor to combine the first feature vector and the second feature vector to a third feature vector, and subsequently to utilize a recurrent neural network (RNN) model to conduct a dimensionality reduction of the third feature vector, thereby producing an input feature vector;
(5) using the main processor to convert the input feature vector to a plurality of emotional scores that are respectively corresponding to a plurality of basic emotions, and to convert the input feature vector to an emotion dimension value;
(6) using the main processor to convert the input feature vector to a plurality of facial action values, and then to determine a facial action based on the plurality of facial action values; and
(7) using the main processor to utilize a facial emotion recognition (FER) model to evaluate an emotion state of the user according to the facial action, the emotion dimension value, the plurality of emotional scores.

In one embodiment, the RNN model is established by using artificial neural networks selected from a group consisting of long short-term memory (LSTM) neural networks and gate recurrent unit (GRU) neural networks.

In one embodiment, the main processor combines the first feature vector and the second feature vector to the third feature vector after completing an operation selected from a group consisting of pointwise addition operation and vector concatenation operation.

In one embodiment, a pre-trained model is used by the main processor to extract the plurality of facial expression features from the face region, so as to output the second feature vector.

In one embodiment, the pre-trained model is selected from a group consisting of VGG16 model and VGG19 model, and the plurality of basic emotions comprise neutral, surprise, happiness, angry, disgust, fear, and sadness.

In one embodiment, the main processor is further embedded with one program including instructions for:
conducting a brightness quality estimation of the face region, and then outputting a first estimation value;
conducting a head rotation angle estimation of the face region, and then outputting a second estimation value;
calculating an image quality loss weight based on the first estimation value and the second estimation value; and
adjusting an image quality of the face region by using the image quality loss weight.

In one embodiment, the main processor is further embedded with one program including instructions for:
conducting a model training of the FER model by using a training sample set, the facial action, the emotion dimension value, the plurality of emotional scores.

In one embodiment, the main processor is further embedded with one program including instructions for:
calculating a plurality of average emotion feature vectors based on the plurality of emotional scores that are in correspondence to the plurality of basic emotions;
calculating a plurality of Euclidean distances based on the plurality of emotional scores that are in correspondence to the plurality of basic emotions;
calculating an emotion feature loss weight based on the plurality of average emotion feature vectors and the plurality of Euclidean distances; and
adjusting at least one of the plurality of emotional scores by using the emotion feature loss weight before starting to conduct the model training of the FER model.

In one embodiment, the main processor is further embedded with one program including instructions for:
calculating a score loss of each of the plurality of emotional scores by using a cross entropy loss algorithm;
calculating a value loss of the emotion dimension value by using a mean square error loss algorithm and a concordance correlation coefficient loss algorithm; and
calculating a value loss of each of the plurality of facial action values by using a binary cross entropy loss algorithm.

In one embodiment, the main processor and the camera are both integrated in an electronic device selected from a group consisting of smart television, smartphone, tablet computer, laptop computer, physiological parameter measuring device, electronic kiosk, and video door phone system.

In another one embodiment, the main processor is integrated in an electronic device, and is coupled to the camera through a wired connection or a wireless communication; the electronic device being selected from a group consisting of desktop computer, smart television, smartphone, tablet computer, laptop computer, physiological parameter measuring device, electronic kiosk, and video door phone system.

BRIEF DESCRIPTION OF THE DRAWINGS

The invention as well as a preferred mode of use and advantages thereof will be best understood by referring to the following detailed descriptions of an illustrative embodiment in conjunction with the accompanying drawings, wherein.

DETAILED DESCRIPTION OF THE PREFERRED EMBODIMENTS

To more clearly describe a system and method of image processing based emotion recognition according to the present invention, related embodiments will be described in detail with reference to the attached drawings hereinafter.

First Embodiment

Figure 1:
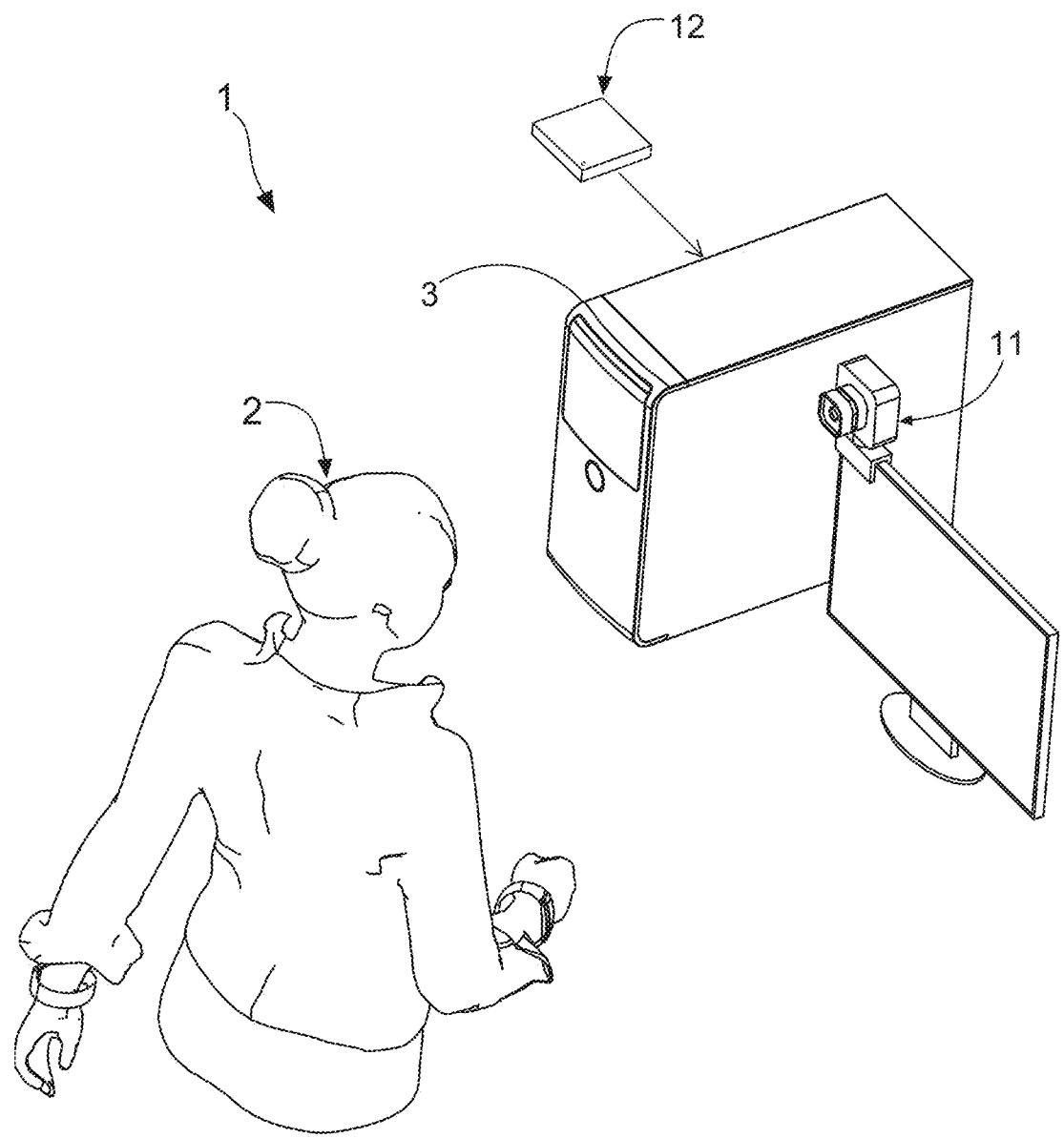
FIG. 1 shows a schematic diagram for describing a system of image processing based emotion recognition according to the present invention.

With reference to FIG. 1, there is shown a schematic diagram for describing a system of image processing based emotion recognition according to the present invention. As FIG. 1 shows, the system 1 principally comprises: a camera 11 and a main processor 12, of which the main processor 12 is integrated in an electronic device 3, and is coupled to the camera 11 through wired connection or wireless communication. Although FIG. 1 depicts that the electronic device 3 is a desktop computer, the electronic device 3 is not limited to be a desktop computer.

In any practicable embodiments, the electronic device 3 can be a desktop computer, a smart television, a smartphone, a tablet computer, a laptop computer, a physiological parameter measuring device, an electronic kiosk, or a video door phone system. Of course, it is known that some electronic devices 3 like smartphone and tablet computer have been provided with camera module therein, such case means that the main processor 12 and the camera 11 of the system 1 of the present invention are integrated in an identical electronic device 3.

Figure 2:
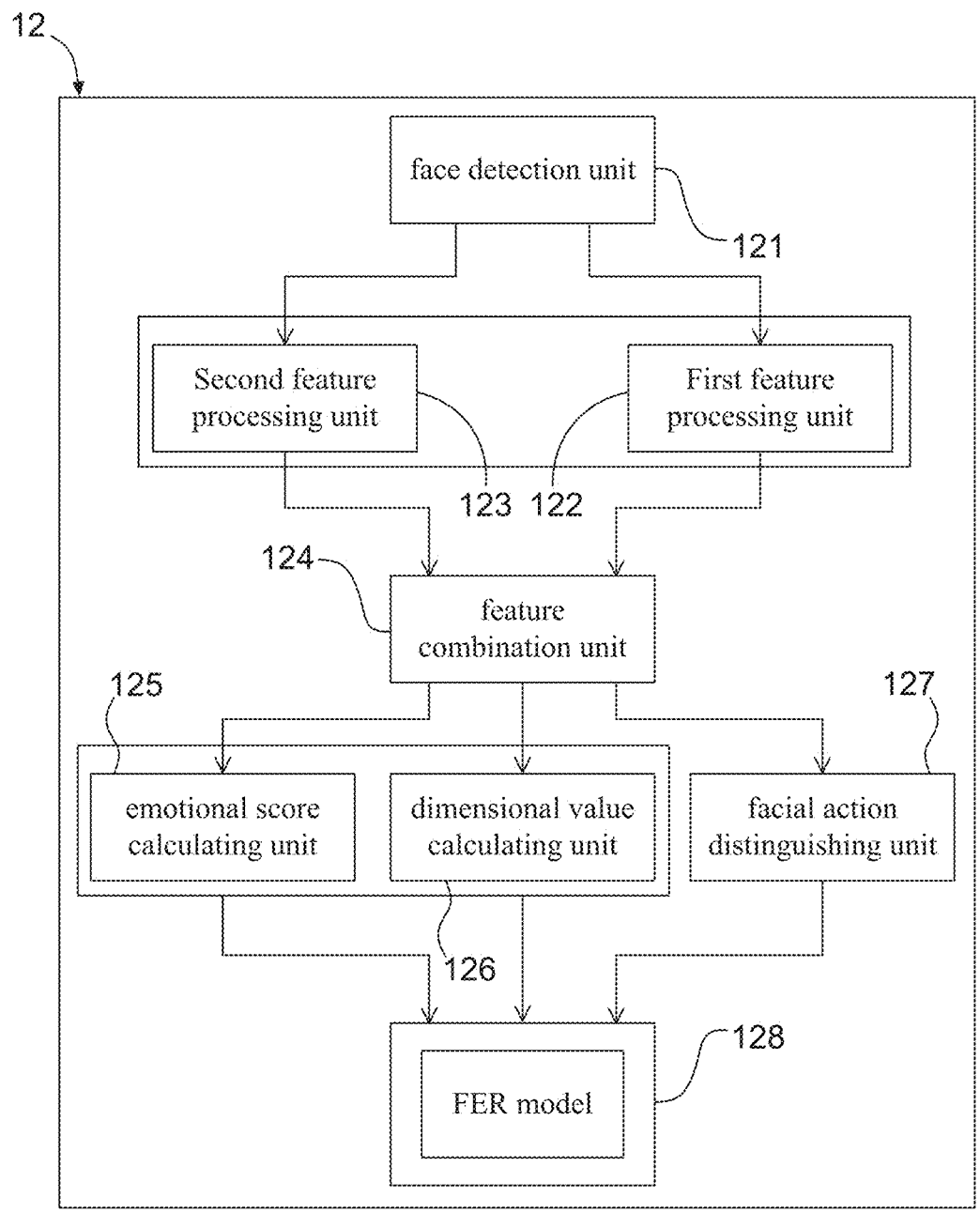
FIG. 2 shows a first block diagram of a main processor as illustrated in FIG. 1.

Continuously referring to FIG. 1, and please simultaneously refer to FIG. 2 which illustrates a first block diagram of the main processor 12. As FIG. 1 and FIG. 2 shows, there are multiple functionality units provided in the main processor 12 by a form of function libraries, application programs, and/or operands. The functionality units comprises: a face detection unit 121, a first feature processing module 122, a second feature processing module 123, a feature combination unit 124, a conversion module consisting of an emotional score calculating unit 125, a dimensional value calculating unit 126 and a facial action distinguishing unit 127, and an emotion recognition unit 128.

Figure 3A:
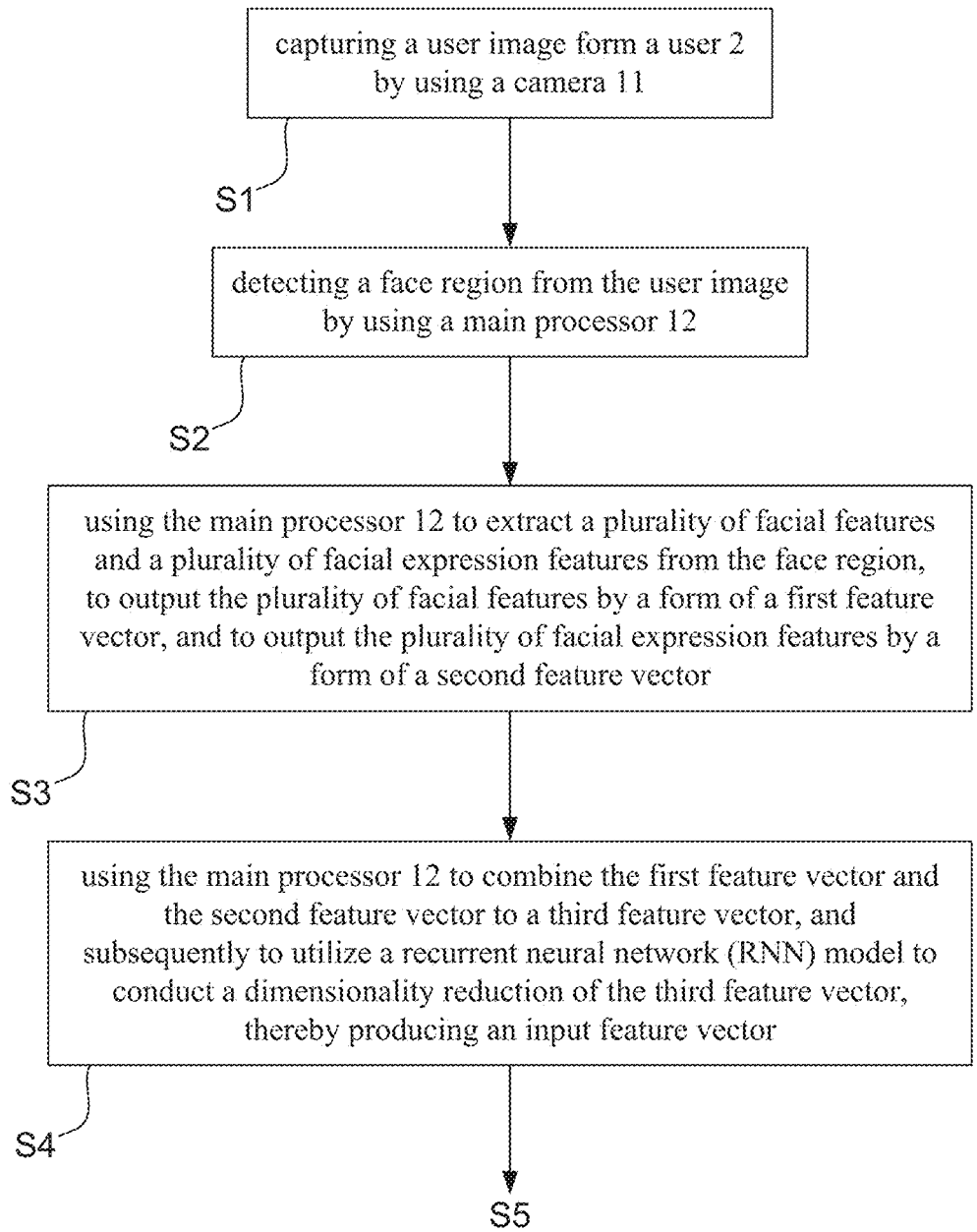
FIG. 3A and FIG. 3B shows a flowchart of a method of image processing based emotion recognition according to the present invention.
Figure 3B:
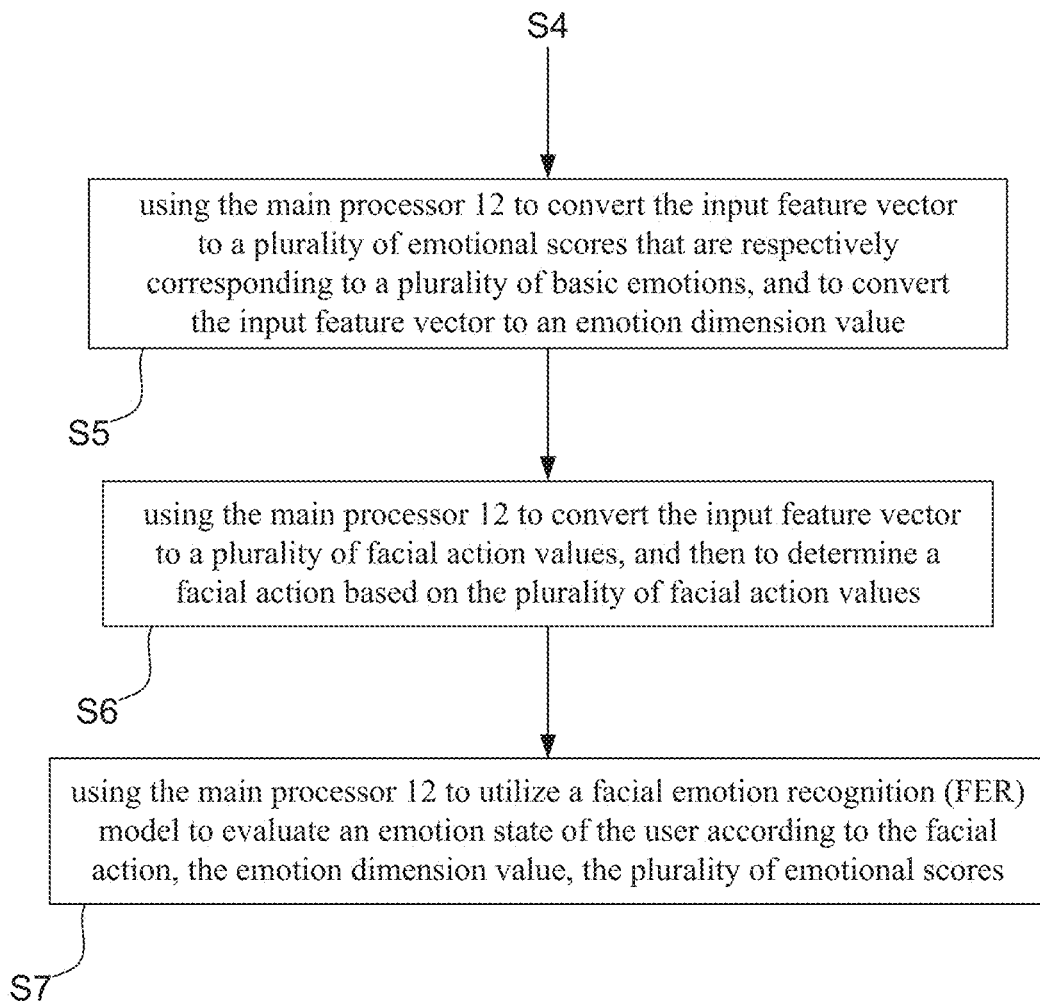

FIG. 3A and FIG. 3B shows a flowchart of a method of image processing based emotion recognition according to the present invention. When adopting the system 1 as illustrated in FIG. 1 to conduct a facial emotion recognition of a user 2, the camera 1 is firstly controlled by the main processor 12 to capture a user image form the user 2 (i.e., step S1). In step S2, the main processor 12 utilizes the face detection unit 121 to detect a face region from the user image. As described in more detail below, after detecting a face region from the user image, the face detection unit 121 subsequently finds out the five face features in the face region, i.e., eyes, nose, mouth, chin, and face shape. Subsequently, the face region is moved so as to position the tip of the nose at a center point of the user image. After that, the face region is rotated by taking the tip of the nose as a rotation center, so as to make the eyes be on a horizontal line. Consequently, the face region is cut off from the user image.

The method flow is subsequently proceeded to step S3. In step S3, the main processor 12 utilizes the first feature processing unit 122 to extract a plurality of facial features from the face region, and then output the plurality of facial features by a form of a first feature vector. Simultaneously, in step S3, the main processor 12 also utilizes the second feature processing unit 123 to extract a plurality of facial expression features from the face region, and then output the plurality of facial expression features by a form of a second feature vector. In following table (1), multiple facial expression features in correspondence to basic emotions are exemplarily presented.

TABLE 1

| Basic emotion | Facial expression features |
| --- | --- |
| Surprise | Mouth is opened. |
| | Eyebrows are raised and arched. |
| Happiness | Corners of mouth are slightly raised |
| Angry | Eyebrows are lowered and knit together. |
| | Eyes stare intensely. |
| Disgust | Eyes blink quickly or blink too little. |
| | Eyebrows knit together. |
| Fear | Eyes close tightly. |
| Sadness | Eyebrows are lowered and knit together. |
| | Inner corners of eyebrows are drawn up. |

For example, there are 70 facial features extracted from the face region by the first feature processing unit 122, and the 70 facial features are outputted to a 512-dimension feature vector by the first feature processing unit 122. Moreover, in one embodiment, the second feature processing unit 123 is a pre-trained model like VGG16 model and VGG19 model, and the main processor 12 utilizes the pre-trained model to extract the plurality of facial expression features from the face region, so as to output the second feature vector.

As FIG. 2 and FIG. 3A show, the method flow is subsequently proceeded to step S4. In step S4, the main processor 12 utilizes the feature combination unit 124 to combine the first feature vector and the second feature vector to a third feature vector by completing a pointwise addition operation or a vector concatenation operation. Moreover, the feature combination unit 124 subsequently utilizes a recurrent neural network (RNN) model to conduct a dimensionality reduction of the third feature vector, thereby producing an input feature vector. In one embodiment, the RNN model is established by using artificial neural networks, for example, long short-term memory (LSTM) neural networks and gate recurrent unit (GRU) neural networks.

As FIG. 2 and FIG. 3B show, the method flow is next proceeded to steps S5-S6. In step S5, the main processor 12 utilizes a conversion module to convert the input feature vector to a plurality of emotional scores that are respectively corresponding to a plurality of basic emotions, and to convert the input feature vector to an emotion dimension value. Subsequently, in step S6, the main processor 12 utilizes the conversion module to convert the input feature vector to a plurality of facial action values, and then to determine a facial action based on the plurality of facial action values.

The plurality of basic emotions are neutral, surprise, happiness, angry, disgust, fear, and sadness. On the other hand, FIG. 2 depicts that the conversion module consists of an emotional score calculating unit 125, a dimensional value calculating unit 126 and a facial action distinguishing unit 127, of which the emotional score calculating unit 125 is configured for converting the input feature vector to a plurality of emotional scores that are respectively corresponding to a plurality of basic emotions. Moreover, the dimensional value calculating unit 126 is configured for converting the input feature vector to an emotion dimension value. On the other hand, the facial action distinguishing unit 127 is configured for converting the input feature vector to a plurality of facial action values, so as to determine a facial action based on the plurality of facial action values. For example, the plurality of facial action values include AU1, AU2, AU4, AU6, AU12, AU15, AU20, and AU15, and the facial action distinguishing unit 127 determines a facial action based on the foregoing 8 facial action values. Eventually, the method flow proceeds to step S7, such that the main processor 12 utilizes the emotion recognition unit 128 to conduct a facial emotion recognition of the user 2 based on the facial action, the emotion dimension value, the plurality of emotional scores. As explained in more detail below, the emotion recognition unit 128 is provided in the main processor 12 by a form of a facial emotion recognition (FER) model, and the FER model is adopted for evaluating an emotion state of the user according to the facial action, the emotion dimension value, the plurality of emotional scores, thereby completing the facial emotion recognition of the user 2.

Second Embodiment

Figure 4:
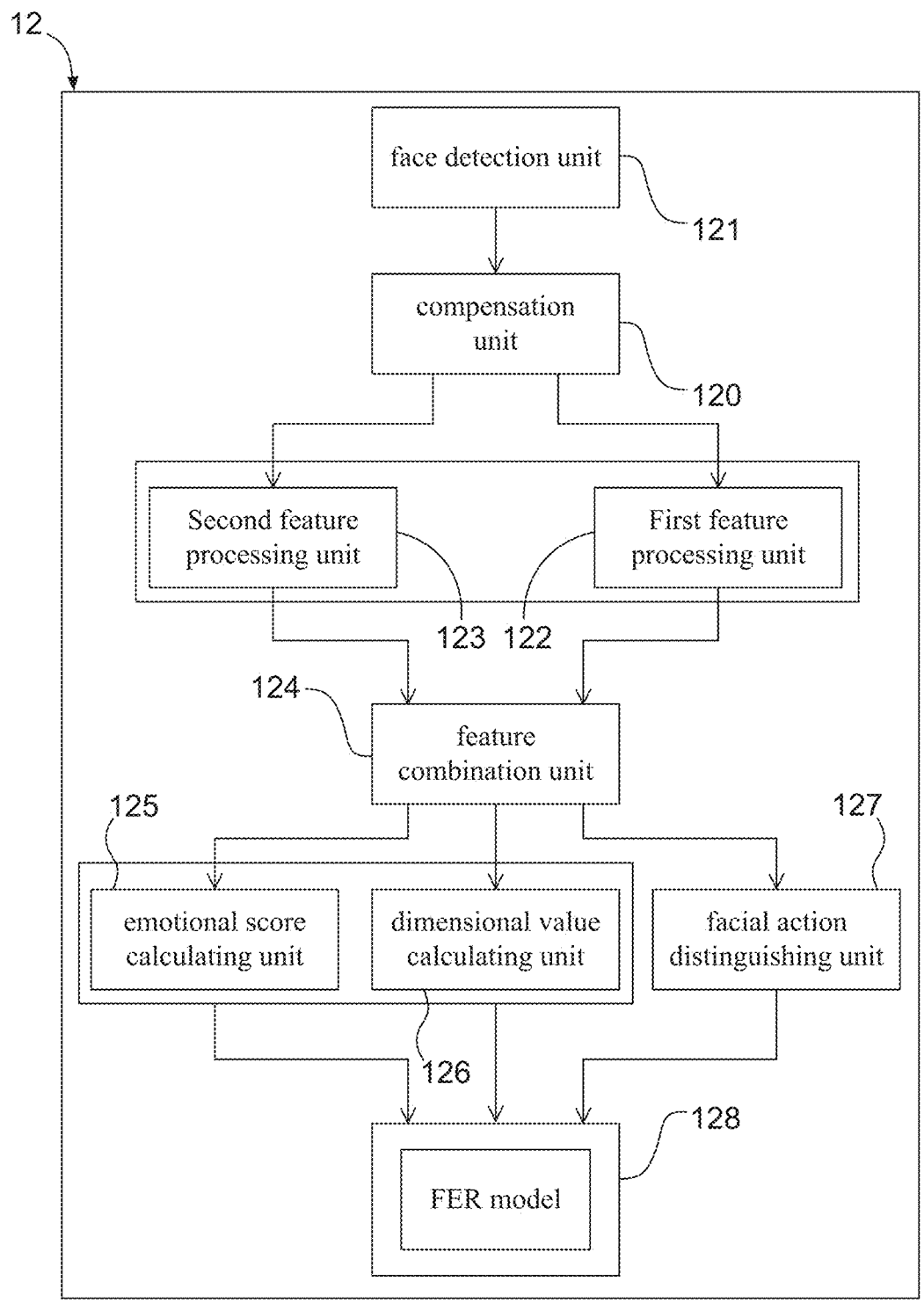
FIG. 4 shows a second block diagram of the main processor as illustrated in FIG. 1.

With reference to FIG. 1 again, and please simultaneously refer to FIG. 4 which illustrates a second block diagram of the main processor 12 as illustrated in FIG. 1. In second embodiment, the main processor 12 is further provided with a compensation unit 120 therein. In other words, the main processor 12 is further embedded with one program including instructions, such that the main processor 12 is able to apply an image process for compensating the image quality loss of the user image before starting to conduct the feature extractions. The image process comprises following steps:
(1a) conducting a brightness quality estimation of the face region, and then outputting a first estimation value;
(2a) conducting a head rotation angle estimation of the face region, and then outputting a second estimation value;
(3a) calculating an image quality loss weight based on the first estimation value and the second estimation value; and
(4a) adjusting an image quality of the face region by using the image quality loss weight.

Third Embodiment

Figure 5:
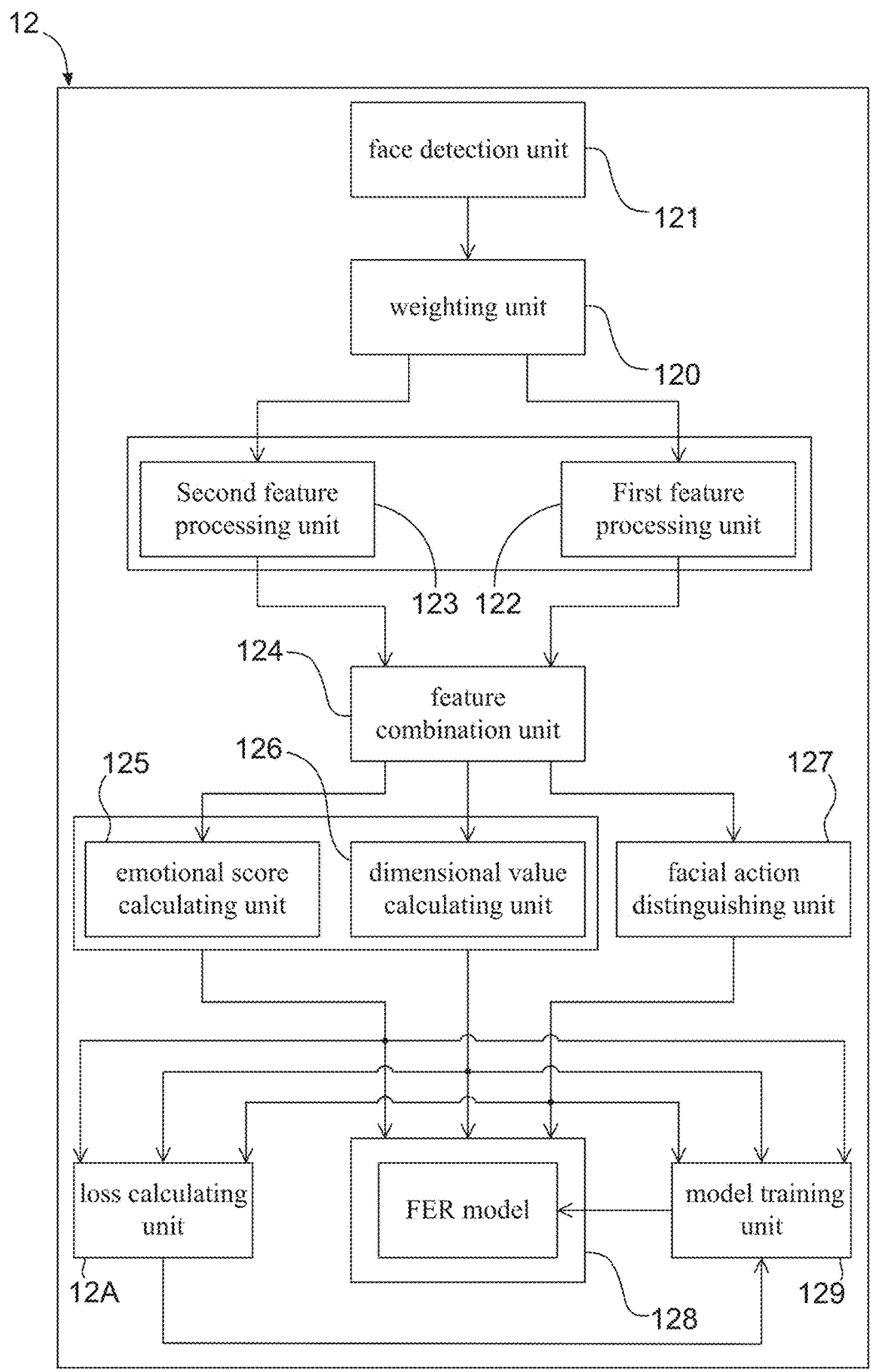
FIG. 5 shows a third block diagram of the main processor as illustrated in FIG. 1.

With reference to FIG. 1 again, and please simultaneously refer to FIG. 5 which illustrates a third block diagram of the main processor 12 as illustrated in FIG. 1. In third embodiment, the main processor 12 is further provided with a loss calculating unit 12A and a model training unit 129. Engineers skilled in development and manufacture of apparatus for facial emotion recognition certainly know that, there are many famous databases for acquiring facial feature samples, for example, Fer2013 dataset, Real-world Affective Faces (RAF) Database, AffectNet Dataset, CK+, and JAFFE. Therefore, in case of the databases having a data updating of the facial feature samples, the model training unit 129 is configured for conducting a model training of the FER model (i.e., the emotion recognition unit 128) by using a training sample set, the facial action, the emotion dimension value, the plurality of emotional scores. As a result, the accuracy of the emotion recognition conducted by the emotion recognition unit 128 is significantly enhanced because basis of the emotion recognition comprises basic emotions, emotional dimension(s) and the user's facial action.

Particularly, the model training unit 129 is also configured to properly adjust at least one of the plurality of emotional scores before starting to conduct the model training of the FER model. According to the present invention, the model training unit 129 calculates a plurality of average emotion feature vectors based on the plurality of emotional scores that are in correspondence to the plurality of basic emotions, and also calculates a plurality of Euclidean distances based on the plurality of emotional scores that are in correspondence to the plurality of basic emotions. After that, the model training unit 129 is able to calculate an emotion feature loss weight based on the plurality of average emotion feature vectors and the plurality of Euclidean distances, thereby adjusting at least one of the plurality of emotional scores by using the emotion feature loss weight.

On the other hand, the loss calculating unit 12A is provided in the main processor 12 for:
calculating a score loss of each of the plurality of emotional scores by using a cross entropy loss algorithm;
calculating a value loss of the emotion dimension value by using a mean square error loss algorithm and a concordance correlation coefficient loss algorithm; and
calculating a value loss of each of the plurality of facial action values by using a binary cross entropy loss algorithm.

Therefore, through above descriptions, the system and method of image processing based emotion recognition according to the present invention has been introduced completely and clearly. However, the embodiments are not intended to limit the scope of the present invention, and all equivalent implementations or alterations within the spirit of the present invention still fall within the scope of the present invention.

What is claimed is:
1. A system of image processing based emotion recognition, comprising:
a camera, being faced to a user for capturing a user image;
a main processor, being coupled to the camera, and comprising one or more embedded programs including instructions for:
detecting a face region from the user image;
extracting a plurality of facial features and a plurality of facial expression features from the face region, and subsequently outputting the plurality of facial features by a form of a first feature vector, and outputting the plurality of facial expression features by a form of a second feature vector;
combining the first feature vector and the second feature vector to a third feature vector, and then utilizing a recurrent neural network (RNN) model to conduct a dimensionality reduction of the third feature vector, thereby producing an input feature vector;

converting the input feature vector to a plurality of emotional scores that are respectively corresponding to a plurality of basic emotions, and also converting the input feature vector to an emotion dimension value;

converting the input feature vector to a plurality of facial action values, and then determining a facial action based on the plurality of facial action values; and utilizing a facial emotion recognition (FER) model to evaluate an emotion state of the user according to the facial action, the emotion dimension value, the plurality of emotional scores.

2. The system of claim 1, wherein the RNN model is established by using artificial neural networks selected from a group consisting of long short-term memory (LSTM) neural networks and gate recurrent unit (GRU) neural networks.

3. The system of claim 1, wherein the main processor combines the first feature vector and the second feature vector to the third feature vector after completing an operation selected from a group consisting of pointwise addition operation and vector concatenation operation.

4. The system of claim 1, wherein a pre-trained model is used by the main processor to extract the plurality of facial expression features from the face region, so as to output the second feature vector.

5. The system of claim 4, wherein the pre-trained model being selected from a group consisting of VGG16 model and VGG19 model.

6. The system of claim 1, wherein the plurality of basic emotions comprise neutral, surprise, happiness, angry, disgust, fear, and sadness.

7. The system of claim 1, wherein the main processor is further embedded with one program including instructions for:

conducting a brightness quality estimation of the face region, and then outputting a first estimation value;

conducting a head rotation angle estimation of the face region, and then outputting a second estimation value;

calculating an image quality loss weight based on the first estimation value and the second estimation value; and adjusting an image quality of the face region by using the image quality loss weight.

8. The system of claim 1, wherein the main processor is further embedded with one program including instructions for:

conducting a model training of the FER model by using a training sample set, the facial action, the emotion dimension value, the plurality of emotional scores.

9. The system of claim 8, wherein the main processor is further embedded with one program including instructions for:

calculating a plurality of average emotion feature vectors based on the plurality of emotional scores that are in correspondence to the plurality of basic emotions;

calculating a plurality of Euclidean distances based on the plurality of emotional scores that are in correspondence to the plurality of basic emotions;

calculating an emotion feature loss weight based on the plurality of average emotion feature vectors and the plurality of Euclidean distances; and adjusting at least one of the plurality of emotional scores by using the emotion feature loss weight before starting to conduct the model training of the FER model.

10. The system of claim 1, wherein the main processor is further embedded with one program including instructions for:

calculating a score loss of each of the plurality of emotional scores by using a cross entropy loss algorithm;

calculating a value loss of the emotion dimension value by using a mean square error loss algorithm and a concordance correlation coefficient loss algorithm; and calculating a value loss of each of the plurality of facial action values by using a binary cross entropy loss algorithm.

11. The system of claim 1, wherein the main processor and the camera are both integrated in an electronic device selected from a group consisting of desktop computer, smart television, smartphone, tablet computer, laptop computer, physiological parameter measuring device, electronic kiosk, and video door phone system.

12. The system of claim 1, wherein the main processor is integrated in an electronic device, and being coupled to the camera; the electronic device being selected from a group consisting of smart television, smartphone, tablet computer, laptop computer, physiological parameter measuring device, electronic kiosk, and video door phone system.

13. A method of image processing based emotion recognition, comprising a plurality of steps of:

(1) capturing a user image form a user by using a camera;

(2) detecting a face region from the user image by using a main processor;

(3) using the main processor to extract a plurality of facial features and a plurality of facial expression features from the face region, to output the plurality of facial features by a form of a first feature vector, and to output the plurality of facial expression features by a form of a second feature vector;

(4) using the main processor to combine the first feature vector and the second feature vector to a third feature vector, and subsequently to utilize a recurrent neural network (RNN) model to conduct a dimensionality reduction of the third feature vector, thereby producing an input feature vector;

(5) using the main processor to convert the input feature vector to a plurality of emotional scores that are respectively corresponding to a plurality of basic emotions, and to convert the input feature vector to an emotion dimension value;

(6) using the main processor to convert the input feature vector to a plurality of facial action values, and then to determine a facial action based on the plurality of facial action values; and (7) using the main processor to utilize a facial emotion recognition (FER) model to evaluate an emotion state of the user according to the facial action, the emotion dimension value, the plurality of emotional scores.

14. The method of claim 13, wherein the RNN model is established by using artificial neural networks selected from a group consisting of long short-term memory (LSTM) neural networks and gate recurrent unit (GRU) neural networks.

15. The method of claim 13, wherein the main processor combines the first feature vector and the second feature vector to the third feature vector after completing an operation selected from a group consisting of pointwise addition operation and vector concatenation operation.

16. The method of claim 13, wherein a pre-trained model is used by the main processor to extract the plurality of facial expression features from the face region, so as to output the second feature vector.

17. The method of claim 16, wherein the pre-trained model being selected from a group consisting of VGG16 model and VGG19 model, and the plurality of basic emotions comprising neutral, surprise, happiness, angry, disgust, fear, and sadness.

18. The method of claim 1, further comprising a plurality of steps that are executed between the step (1) and the step (2); the plurality of steps comprising:
- (1a) conducting a brightness quality estimation of the face region, and then outputting a first estimation value;
- (2a) conducting a head rotation angle estimation of the face region, and then outputting a second estimation value;
- (3a) calculating an image quality loss weight based on the first estimation value and the second estimation value; and
- (4a) adjusting an image quality of the face region by using the image quality loss weight.

19. The method of claim 13, wherein the main processor is further embedded with one program including instructions for:

conducting a model training of the FER model by using a training sample set, the facial action, the emotion dimension value, the plurality of emotional scores.

20. The method of claim 19, wherein the main processor is further embedded with one program including instructions for:

- calculating a plurality of average emotion feature vectors based on the plurality of emotional scores that are in correspondence to the plurality of basic emotions;
- calculating a plurality of Euclidean distances based on the plurality of emotional scores that are in correspondence to the plurality of basic emotions;
- calculating an emotion feature loss weight based on the plurality of average emotion feature vectors and the plurality of Euclidean distances; and
- adjusting at least one of the plurality of emotional scores by using the emotion feature loss weight before starting to conduct the model training of the FER model.

* * * * *